(12) United States Patent
Ban et al.

(10) Patent No.: US 7,355,665 B2
(45) Date of Patent: Apr. 8, 2008

(54) THIN FILM TRANSISTOR ARRAY PANEL AND LIQUID CRYSTAL DISPLAY INCLUDING THE PANEL

(75) Inventors: Byeong-Seob Ban, Yongin-si (KR); Eun-Hee Han, Seoul (KR); Chang-Hun Lee, Yongin-si (KR); Hyun-Wuk Kim, Yongin-si (KR); Ji-Won Sohn, Seoul (KR)

(73) Assignee: Samsung Electronics Co., Ltd. (KR)

( * ) Notice: Subject to any disclaimer, the term of this patent is extended or adjusted under 35 U.S.C. 154(b) by 325 days.

(21) Appl. No.: 11/046,757

(22) Filed: Feb. 1, 2005

(65) Prior Publication Data

US 2005/0185107 A1 Aug. 25, 2005

(30) Foreign Application Priority Data

Feb. 2, 2004 (KR) .................... 10-2004-0006581

(51) Int. Cl.
*G02F 1/1343* (2006.01)
(52) U.S. Cl. .................... 349/141; 349/38; 349/39; 349/139
(58) Field of Classification Search ........... 349/141, 349/38, 39
See application file for complete search history.

(56) References Cited

U.S. PATENT DOCUMENTS

| 5,598,285 | A | 1/1997 | Kondo et al. ............. 349/39 |
| 6,704,082 | B2 * | 3/2004 | Tomioka et al. ......... 349/123 |
| 6,721,028 | B2 * | 4/2004 | Kim et al. ............... 349/141 |
| 6,839,118 | B2 * | 1/2005 | Nagaoka ................. 349/143 |
| 6,856,371 | B2 * | 2/2005 | Kim et al. ............... 349/141 |
| 6,888,601 | B2 * | 5/2005 | Asai et al. .............. 349/141 |

\* cited by examiner

*Primary Examiner*—Michael H. Caley
(74) *Attorney, Agent, or Firm*—Cantor Colburn LLP

(57) ABSTRACT

A thin film transistor array panel may comprise gate lines including gate electrodes and storage electrode lines including storage electrodes that are formed on the insulating substrate, a semiconductor layer formed on the gate insulating layer covering the gate lines, data lines and drain electrodes which are formed on the gate insulating layer, the drain lines including source electrodes formed at least on the semiconductor layer and intersecting the gate lines, and the drain electrodes being separated from the data lines and opposite to the data lines with respect to the gate electrodes and including a storage capacitor conductor overlapping the storage electrodes. Pixel electrodes and common electrodes may be formed on the passivation layer for covering the semiconductor layer. The pixel electrodes and the common electrodes may be neither perpendicular to nor parallel to the data lines and may be made of opaque conductive material.

22 Claims, 9 Drawing Sheets

FIG. 3

| Electrode (material/thickness/distance) | Luminance | | | Response time | | |
|---|---|---|---|---|---|---|
| | black[nits] | white[nits] | Contrast ratio | on time[ms] | off time[ms] | total[ms] |
| Cr/2000Å/8μm | 2.51 | 759.2 | 303.3 | 11.0 | 17.1 | 28.1 |
| Cr/2000Å/10μm | 2.51 | 801.1 | 321.0 | 11.6 | 17.6 | 29.2 |
| Cr/2000Å/12μm | 2.31 | 842.4 | 366.2 | 12.0 | 17.7 | 29.7 |
| Cr/500Å/12μm | 1.26 | 810.6 | 644.2 | 12.8 | 17.7 | 30.5 |
| IZO/900Å/8μm | 2.14 | 832.0 | 389.5 | 12.0 | 17.9 | 29.9 |
| IZO/900Å/10μm | 2.06 | 864.5 | 422.3 | 12.8 | 18.0 | 30.8 |
| IZO/900Å/12μm | 2.17 | 882.5 | 406.7 | 12.4 | 18.2 | 30.6 |
| IZO/1800Å/12μm | 2.41 | 886.7 | 369.2 | 12.0 | 18.3 | 30.3 |

FIG.6

| | Thickness and material of electrode | Black luminance | White luminance | Contrast ratio |
|---|---|---|---|---|
| Test cell | IZO-900 | 2.17 | 882.50 | 406.68 |
| | Cr-500 | 1.26 | 810.60 | 643.33 |
| 17" LCD | IZO-900 | 1.55 | 523.00 | 337.42 |
| | Cr-500 | 0.90 | 480.39 | 533.77 |

THIN FILM TRANSISTOR ARRAY PANEL AND LIQUID CRYSTAL DISPLAY INCLUDING THE PANEL

CROSS REFERENCE TO RELATED APPLICATION

This application claims priority to and the benefit of Korean Patent Application No. 10-2004-0006581, filed on Feb. 2, 2004, which is hereby incorporated by reference for all purposes as if fully set forth herein.

BACKGROUND OF THE INVENTION (a) Field of the Invention

The present invention relates to a thin film transistor array panel. More particularly, the present invention relates to a thin film transistor array panel including electrodes and a thin film transistor formed on the same substrate, capable of generating a horizontal electric field applied to liquid crystal molecules.

(b) Description of the Related Art

Conventional technology for driving liquid crystals by a horizontal electric field was disclosed in U.S. Pat. No. 5,598,285. A liquid crystal display disclosed in U.S. Pat. No. 5,598,285 has pixel electrodes and common electrodes for generating a horizontal electric field. In such a liquid crystal display, the behavior of the liquid crystal molecules is distorted at upper and lower portions of a pixel. This is where a common electrode line connected with the common electrodes and transmitting a common signal is disposed. The distortion may be covered by widening a black matrix, but doing so reduces the aperture ratio.

In addition, the coupling between data lines for applying voltages to pixel electrodes and the pixel electrodes or the common electrodes adjacent to the data lines can distort the liquid crystal driving and cause light leakage and crosstalk. This may be solved by widening the common electrodes adjacent to the data lines, but such a fix also reduces the aperture ratio.

The common electrodes and the pixel electrodes are preferably formed with transparent conductive material to increase aperture ratio of the liquid crystal display. Such a liquid crystal display shows improved luminance in displaying a bright image. However, it has a problem with displaying dark image due to light leakage. As a result, this liquid crystal display has a low contrast ratio.

SUMMARY OF THE INVENTION

The present invention may increase the aperture ratio of a liquid crystal display (LCD) which drives liquid crystal by applying a horizontal electric field.

The present invention may provide a thin film transistor array panel for an LCD that has a high contrast ratio.

An LCD may include common electrodes and pixel electrodes that are disposed parallel to each other and have inclination angles such that they are not perpendicular or parallel to gate lines or data lines, and the common electrodes or the pixel electrodes may be formed of opaque conductive material.

In detail, a thin film transistor array panel according to an embodiment of the present invention may include a plurality of gate lines formed on an insulating substrate and including a plurality of gate electrodes, a gate insulating layer covering the gate lines, a semiconductor layer formed on the gate insulating layer, a plurality of data lines having source electrodes formed at least on the semiconductor layer and intersecting the gate lines, a plurality of drain electrodes separated from the data lines and opposite to the data lines with respect to the gate electrode, a passivation layer covering the semiconductor layer that is not covered with the data lines and the drain electrodes, a plurality of linear pixel electrodes formed on the passivation layer and connected to the drain electrodes, at least two of the linear pixel electrodes disposed in each pixel area, and a plurality of common electrodes formed on the passivation layer (alternately arranged along with the pixel electrodes in a certain distance and parallel to the pixel electrodes). The pixel electrodes and the common electrodes may be neither perpendicular to nor parallel to the data lines and are made of opaque conductive material.

The pixel electrodes and the common electrodes may be symmetrically arranged with respect to a transverse center line of the pixel. The common electrodes and the pixel electrodes may make an inclination angle in a range of about 60 to about 85 degrees with the data lines.

The thin film transistor array panel may further include a plurality of storage electrode lines formed on the substrate and extending in the same direction as the gate lines. Each storage electrode line may have a plurality of storage electrodes are wider than the other portions.

The thin film transistor array panel may further include a plurality of pixel electrode lines. Each pixel electrode line may connect to a pixel electrode and may have a first expansion portion overlapping the storage electrode. The drain electrodes may include a storage capacitor conductor that extends to overlap the storage electrode and to form a storage capacitor. The first expansion portion may be connected to the storage capacitor conductor through a contact hole of the passivation layer.

The thin film transistor array panel may further include a common electrode body for electrically connecting the common electrodes. The common electrode body may include a plurality of second expansion portions that have boundary lines parallel to that of the first expansion portion. The storage capacitor conductor and the first or the second expansion portion may have a boundary line symmetrical with respect to the transverse centerline of the pixel.

The thin film transistor array panel may further include red, green, and blue color filters formed under the pixel electrodes and the common electrodes and sequentially arranged in the pixel area. The pixel electrodes and the common electrodes may be about 300 to about 1,000 Å thick.

A liquid crystal display can include the thin film transistor array panel described above, an opposite panel facing the thin film transistor array panel, and a liquid crystal layer interposed between the thin film transistor array panel and the opposite panel thereof.

Liquid crystal molecules of the liquid crystal layer may be initially aligned perpendicular to or parallel to the data lines.

BRIEF DESCRIPTION OF THE DRAWINGS

FIG. 3 is a table showing the luminance, contrast ratio, and response time of the LCD test cells having an electrode of different material, thickness, and width.

FIG. 6 is a table showing luminance and contrast ratio of 17" LCDs and test cells of FIG. 3 having an electrode of different material and thickness.

DETAILED DESCRIPTION OF THE PREFERRED EMBODIMENTS

Figure 1:
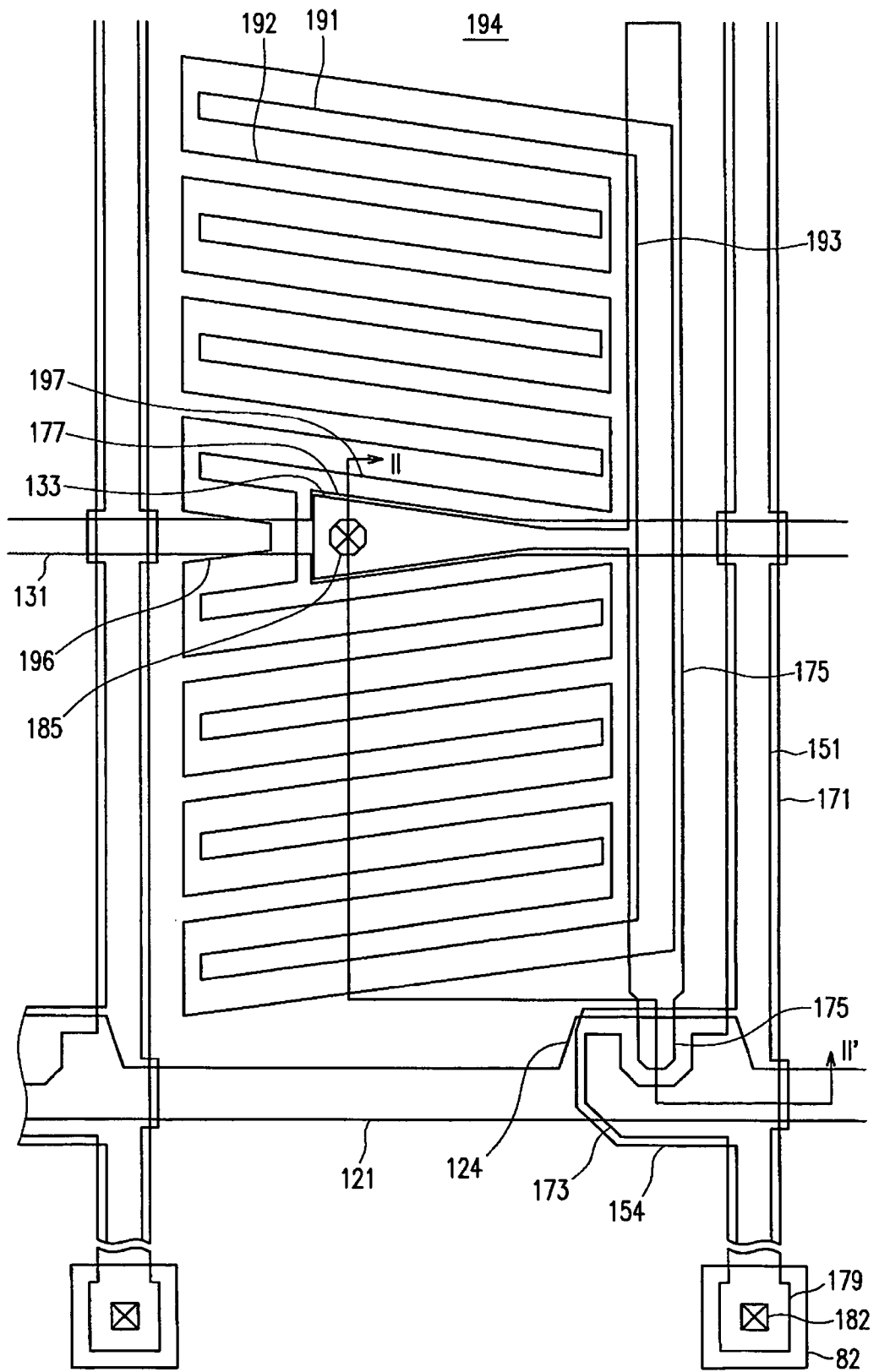
FIG. 1 is a layout view showing a structure of a thin film transistor (TFT) array panel for a liquid crystal display (LCD) according to a first embodiment of the present invention.

The present invention now will be described more fully hereinafter with reference to the accompanying drawings, in which preferred embodiments of the invention are shown. The present invention may, however, be embodied in many different forms and should not be construed as being limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may lie between them.

A thin film transistor (TFT) array panel and a liquid crystal display (LCD) including the panel according to embodiments of the present invention will be described with reference to the accompanying drawings.

Figure 2:
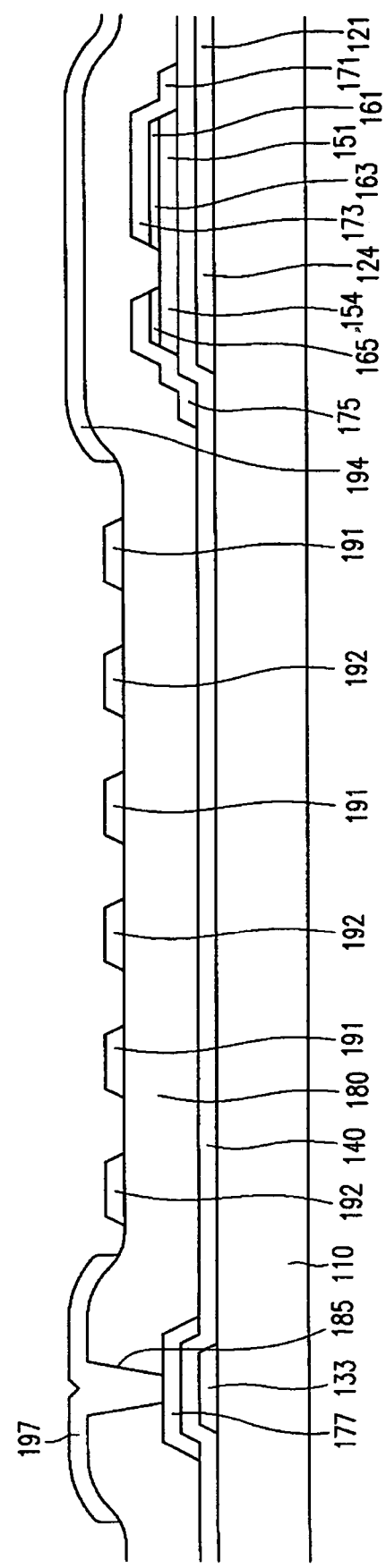
FIG. 2 is a sectional view of the TFT array panel taken along the lines II-II' of FIG. 1.

As shown in FIG. 1 and FIG. 2, a plurality of gate lines 121 that substantially extend in a transverse direction, may be formed on an insulating substrate 110. The gate lines 121 may include a single film made of low resistivity metal such as Ag, an Ag alloy, Al or an Al alloy. The gate lines 121 may have a multi-layered structure including one film made of the above-mentioned metal and at least one film for pad which has good contact characteristics with other materials.

A contact portion (not shown) located near an end of the gate lines 121 may receive gate signals from an exterior circuit. In an embodiment without a contact portion, a gate driving integrated circuit may be directly fabricated on the substrate 110, and the end portion of the gate line may be directly connected to the output terminal of the gate driving integrated circuit.

Each gate line 121 has a plurality of gate electrodes 124 of TFTs. The gate electrodes 124 may be formed as branches of the gate line 121. The gate lines 124 may extend in a transverse direction, but may be curved near the boundary of pixel areas to define a trapezoidal pixel area by intersecting data lines 171 which will be described later, but is not limited to defining the pixel area.

In addition, storage electrode lines 131 which extend in a transverse direction at the center of pixel are formed on the same layer as the gate lines 121 on the insulating substrate 110. The storage electrode lines 131 have storage electrodes 133, which have wider width than the other portions and are disposed in each pixel. Each storage electrode 133 overlaps a conductive pattern 177 which is connected to the drain electrode 175 to form a storage capacitor. The storage electrode 133 may have an inverted symmetric structure with respect to the center line of the storage electrode line 131 and may include boundary lines inclined with respect to the gate lines 121 or the data lines 171.

The gate lines 121 and the storage electrode lines 131 may include two films which have different physical characteristics. They may include a conductive film made of a low resistivity metal such as Al, Al alloy, or Al containing metal for reducing signal delay or voltage drop. The other conductive film may be made of a material such as Mo and Mo alloy (e.g. MoW alloy), Cr, or another material that has good physical, chemical, and electrical contact characteristics with other materials such as indium tin oxide (ITO) or indium zinc oxide (IZO).

The lateral sides of the gate lines 121 and the storage electrode lines 131 may be inclined to make an inclination angle in a range of about 30 to about 80 degrees with the surface of the substrate 110.

A gate insulating layer 140 may be made of silicon nitride (SiNx) and may be formed on the gate lines 121.

A plurality of semiconductor stripes 151 made, for example, of hydrogenated amorphous silicon (abbreviated as "a-Si") may be formed on the gate insulating layer 140. Each semiconductor stripe 151 may extend substantially in a longitudinal direction and may have a plurality of protrusions 154 branched out toward the gate electrodes 124. Each semiconductor stripe 151 may be wider around the gate lines 121 and the storage electrode lines 131 such that the semiconductor stripe 151 covers large areas of the gate lines 121 and the storage electrode lines 131.

A plurality of ohmic contact stripes 161 and ohmic contact islands 165 (which may, for example, be made of silicide or n+ hydrogenated a-Si heavily doped with n type impurity) may be formed on the semiconductor 151. Each ohmic contact stripe 161 may have a plurality of protrusions 163. The protrusions 163 and the ohmic contact islands 165 may be located in pairs on the protrusions 154 of the semiconductor 151.

The lateral sides of the semiconductor 151 and the ohmic contacts 161 and 165 may also be inclined to make an inclination angle in a range of about 30 to about 80 degrees with the surface of the substrate 110.

A plurality of data lines 171, a plurality of drain electrodes 175 and a plurality of storage capacitor conductors may be formed on the ohmic contacts 161 and 165 and the gate insulating layer 140.

The data lines 171 for transmitting data voltages may extend substantially in a longitudinal direction and intersect the gate lines 121.

Each data line 171 has a plurality of source electrodes 173 (of TFTs) that may extend toward the drain electrode 175. Each pair of a source electrode 173 and a drain electrode 175 may be separated from each other and may be located opposite to each other with respect to the gate electrodes 124.

Each set of a gate electrode 124, a source electrode 173, and a drain electrode 175 along with a protrusion 154 of semiconductor stripe 151 may form a TFT. A channel of the TFT may be formed in the protrusion 154 between the source electrode 173 and the drain electrode 175.

The drain electrodes 175 which extend parallel to the data lines 171 may be disposed at the edge of the pixel area and may overlap the boundary of the edges of the pixel electrode lines 193 and the common electrode body 194. This positioning may block light leakage at the edge of the pixel.

The storage capacitor conductors 177 connected to the drain electrodes 175 extend into the center of pixels and overlap the storage electrode 133. The storage capacitor conductors 177 may have boundary lines parallel to the boundary lines of the storage electrodes 133.

The data lines 171, the drain electrodes 175, and the storage capacitor conductors 177 may be formed of a lower film made of, for example, Mo, Mo alloy, or Cr and an upper film located thereon and made, for example, of Al containing metal. Also, these elements may be formed of single layer.

The data lines 171, the drain electrodes 175, and the storage capacitor conductors 177 may have inclined lateral sides which make an inclination angle in range of about 30 to about 80 degrees with the surface of the substrate 110.

The ohmic contacts 161 and 165 may be interposed between only the underlying semiconductor stripes 151 and the overlying data lines 171 and drain electrodes 175 to reduce the contact resistance between them.

The semiconductor stripes 151 may have exposed portions that are not covered with the data lines 171 and the drain electrodes 175, such as portions located between the source electrodes 173 and the drain electrodes 175. The semiconductor stripes 151 may be narrower than the data lines 171 in most places but, as explained before, the semiconductor stripes 151 may be wider around the gate lines 121 and storage electrode lines 131. Such a layout may help to prevent disconnection of the data lines 171.

A passivation layer 180 may be formed on the data lines 171, the drain electrodes 175, the storage capacitor conductors 177, and exposed portions of the semiconductor stripes 151. The passivation layer 180 may be made, for example, of photosensitive organic material having a good flatness, or low dielectric insulating material such as a-Si:C:O and a-Si:O:F formed by plasma enhanced chemical vapor deposition (PECVD).

In an embodiment where the passivation layer is made of organic material, the passivation layer may further include an insulating layer made of silicon nitride. Such an insulating layer may prevent direct contact between the semiconductor 151 and the organic material. The device may further include a red, green and blue color filter layer. Other filter colors may also be used.

The passivation layer 180 may have a plurality of contact holes 185 and 182 exposing the storage capacitor conductors 177 and the end portions 179 of the data lines 171, respectively. The contact hole 185 of the passivation 180 for connecting the drain electrodes 175 to the extended portion 197 of the pixel electrode lines 193 may be disposed on the storage capacitor conductor 177. Thus, even if the liquid crystal molecules near the contact hole 185 are arranged in an unintended direction along the inclination of the contact hole 185 whereby a distortion is generated and light leaks, the leakage light may be blocked by the storage capacitor conductor 177. Therefore, it may not generate a declination line when images are displayed, and it may not decrease the aperture ratio of the pixel.

In an embodiment in which the passivation layer 180 has a contact hole 182 exposing the end portions 179 of the data lines 171, the data lines 171 may have contact portions to connect external data driving circuits to the data lines using an anisotropic conductive film. The end portions 179 of the data lines 171 may be wider than the other portions of the data lines 171, if desired.

In the present embodiment, the gate lines 121 have no contact portions at the end portions. Under this structure, a gate driving integrated circuit is directly fabricated on the substrate 110 along with the thin film transistor, and the end portions of the gate lines 121 may be directly connected to the contact portions of the gate driving integrated circuit.

Meanwhile, like the end portions of the data lines, end portions of the gate lines 121 may also have contact portions. In such an embodiment, the passivation layer 180 and the gate insulating layer 140 may have a plurality of contact holes exposing the end portions of the gate lines 121.

A plurality of common electrodes 192 and pixel electrodes 191, which are preferably made of opaque conductive material having low resistivity such as Cr, Mo, and Al and are parallel to each other, are formed on the passivation layer 180.

The boundary lines of the common electrodes 192 and the pixel electrodes 191 which are disposed in a trapezoidal pixel area may be neither perpendicular to nor parallel to the data lines 171, and may be inclined to the data lines 171. The inclination angle thereof may be in the range of about 60 to about 85 degrees. The common electrode 192 and the pixel electrode 191 having the boundary lines parallel to each other may be symmetrical with respect to the transverse centerline of pixel. The common electrode 192 and the pixel electrode 191 may be about 300 Å to about 1000 Å thick.

A pixel electrode line 193 which connects a plurality of pixel electrodes 191 may be formed parallel to the drain electrodes 175 located at an edge of a pixel, and a plurality of common electrodes may be connected by a common electrode body 194 having a planar shape. The pixel electrode line 193 may have a first expansion portion 197. The first expansion portion 197 may have a boundary line parallel to the boundary line of the common electrode 192 and the pixel electrode 191 and may be connected with the drain electrode 175 through a contact hole of the passivation layer 180. The common electrode body 194 may have a second expansion portion 196 which projects inside the pixel and has a boundary line parallel to that of the first expansion portion 197.

The common electrode body 194 has a planar shape that may be changed into a linear shape in order to minimize distortion of the transmitted signals.

An alignment layer (not shown) for aligning liquid crystal molecules may be formed on the passivation layer 180.

The common electrode 192 and the pixel electrode 191 may be disposed on the passivation layer 180 but the common electrode 192 and the pixel electrode 191 may be disposed on the same layer as the gate lines 121 or the data lines 171. Also, the common electrode 192 and the pixel electrode 191 may be disposed together on the same layer but the common electrode 192 and the pixel electrode 191 may be disposed on different layers.

At this time, the electrodes 191 and 192 preferably have thickness equal to or less than 2,000 Å to prevent the occurrence of inferior alignment due to height difference induced by the electrodes 191 and 192 in the alignment layer.

The alignment layer may be rubbed in a direction perpendicular to or parallel to the data lines 171 or the storage electrode lines 132.

In an LCD according to an embodiment of the present invention, a passivation layer 180 made of low dielectric organic material may be interposed between the electrodes 191 and 192, the gate lines 121 and the data lines 171 to weaken the lateral field between them. This feature may enable disposing the electrodes 191 and 192 adjacent to the gate lines 121 and the data lines 171 within a minimum distance. Thus, the aperture ratio of the pixel may be maximized.

Color filters may be interposed between the electrodes 191 and 192, the gate lines 121 and the data lines 171, and this may weaken the lateral field between them. Such an embodiment where color filters are disposed under the common electrodes and the pixel electrodes will be explained in detail later.

Moreover, since the boundary line of the common electrode body 194 adjacent to the data lines 171 extends parallel to the data lines 171 along the long direction of the pixel areas and the rubbing direction is determined such that the liquid crystal molecules are initially aligned perpendicular to the data lines 171, the voltage difference between the data lines 171 and the common electrode body 194 may cause the liquid crystal molecules be in their initial orientations and the corresponding areas to be displayed dark. Thus, light leakage induced by lateral crosstalk between the common electrode body 194 and the data line 171 may be minimized.

In addition, the common electrode wires 192, 194 and the pixel electrode wires 191, 193 may be made of opaque conductive material, thereby luminance may be minimized when a dark image is displayed. As a result, the contrast ratio may be improved.

Also, since the common electrodes and the pixel electrodes are made of low resistivity material (compared to ITO or IZO), the response speed of the liquid crystal may be improved and it may be easy to apply to a large liquid crystal display.

The test result of test cells may aid in better understanding the invention.

Figure 4:
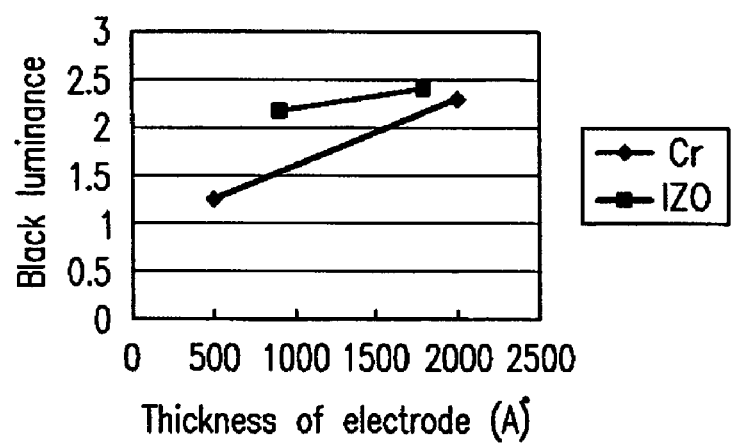
FIG. 4 is a graph showing change in the black luminance of an LCD with change in electrode material and thickness.
Figure 5:
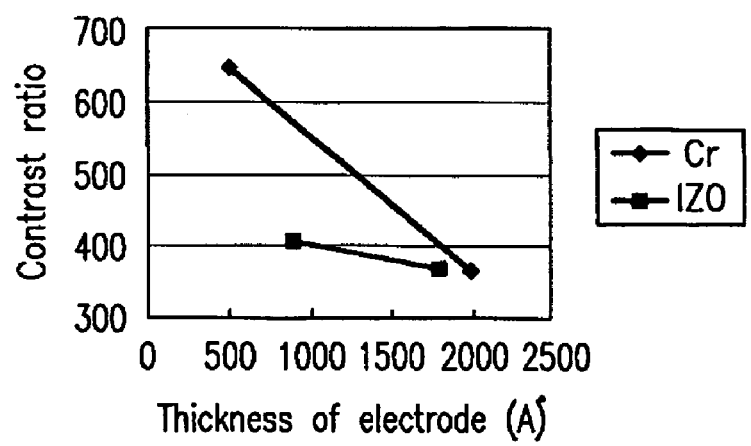
FIG. 5 is a graph showing change in contrast ratio of an LCD with change in electrode material and thickness.

FIG. 3 is a table showing the luminance, contrast ratio, and response time of LCD test cells having an electrode of different material, thickness, and width. FIG. 4 is a graph showing change in black luminance of an LCD according to electrode material and thickness. FIG. 5 is a graph showing change in contrast ratio of an LCD according to electrode material and thickness. FIG. 6 is a table showing luminance and contrast ratio of 17" LCDs and test cells of FIG. 3 having an electrode of different material and thickness.

Eight test cells were manufactured. The eight test cells were diversified by at least one of the following: material of the common electrodes and the pixel electrodes, thickness of the common electrodes and the pixel electrodes, and distance between the common electrodes and the pixel electrodes. "Black," in this context, refers to the luminance when the test cell displays a black image and "white," in this context, refers to the luminance when the test cell displays a white image.

As shown in FIG. 3, an LCD comprising a common electrode and a pixel electrode made of Cr about 2,000 Å thick, as opposed to IZO about 1,800 Å thick, does not show a significant improvement in the contrast ratio but the response time of liquid crystal decrease.

Also, an LCD comprising a common electrode and a pixel electrode made of Cr about 500 Å thick, as opposed to IZO about 900 Å thick, shows significant improvement in the contrast ratio from 406.7 to 644.2.

As shown in FIG. 4, when a common electrode wire and a pixel electrode wire are made of Cr, as opposed to IZO, the luminance in the dark state decreases and the luminance in the dark state increases as the thickness increases.

As shown in FIG. 5, when the common electrode wire and the pixel electrode wire are made of Cr, as opposed to IZO, the contrast ratio improves and the contrast ratio decreases as the thickness increases.

As shown in FIG. 6, a 17" LCD shows a slightly lower contrast ratio than the test cell. However, when a common electrode wire and a pixel electrode wire are made of Cr about 500 Å thick, as opposed to IZO about 900 Å thick, a high contrast ratio results.

An LCD of the present invention may have a different structure TFT array panel, which will be explained in detail with reference to figures.

Figure 7:
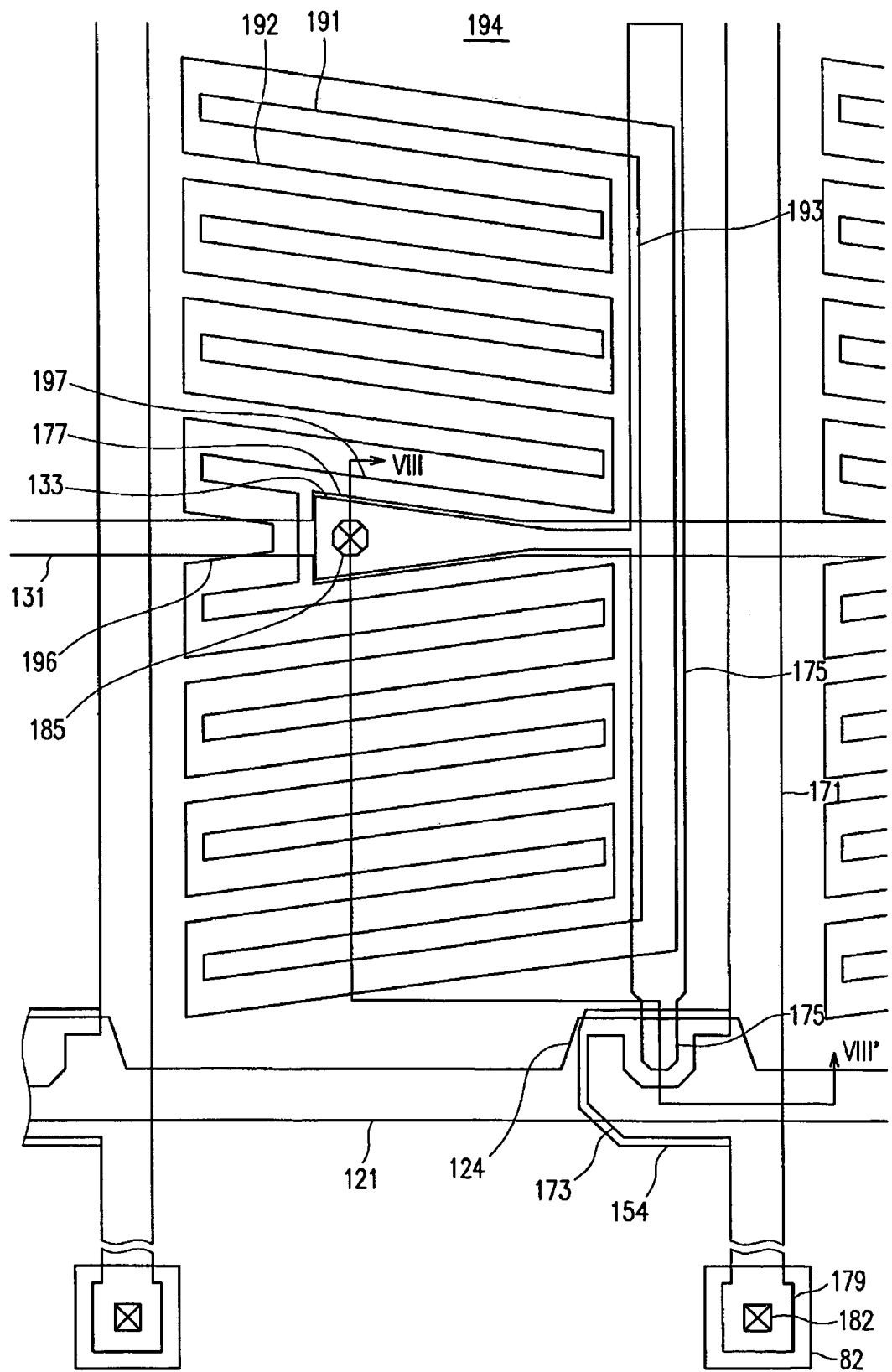
FIG. 7 is a layout view of a TFT array panel for an LCD according to a second embodiment of the present invention.
Figure 8:
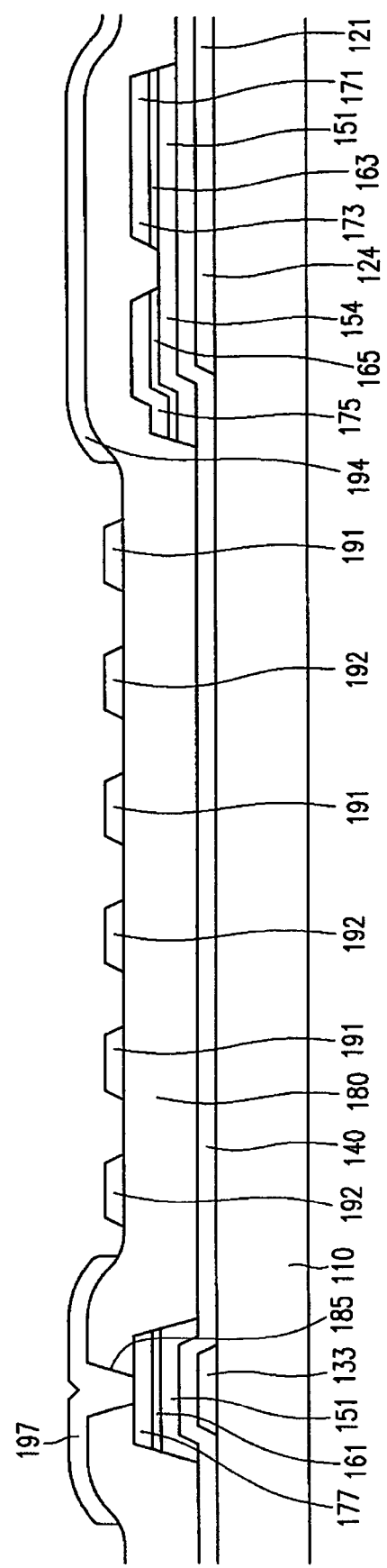
FIG. 8 is a sectional view of the TFT array panel taken along the lines VIII-VIII' of FIG. 7.
Figure 9:
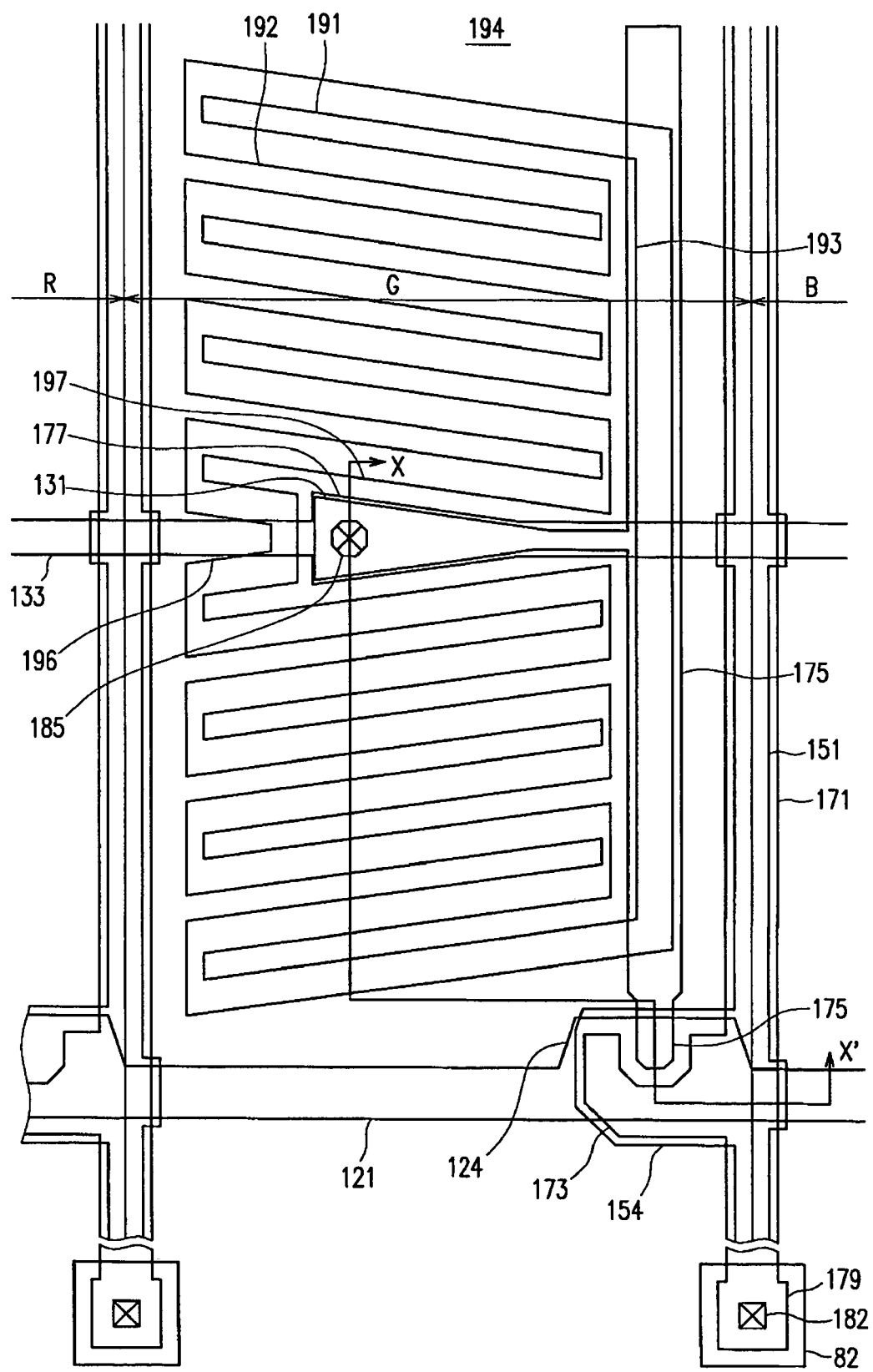
FIG. 9 is a layout view of a TFT array panel according to a third embodiment of the present invention.
Figure 10:
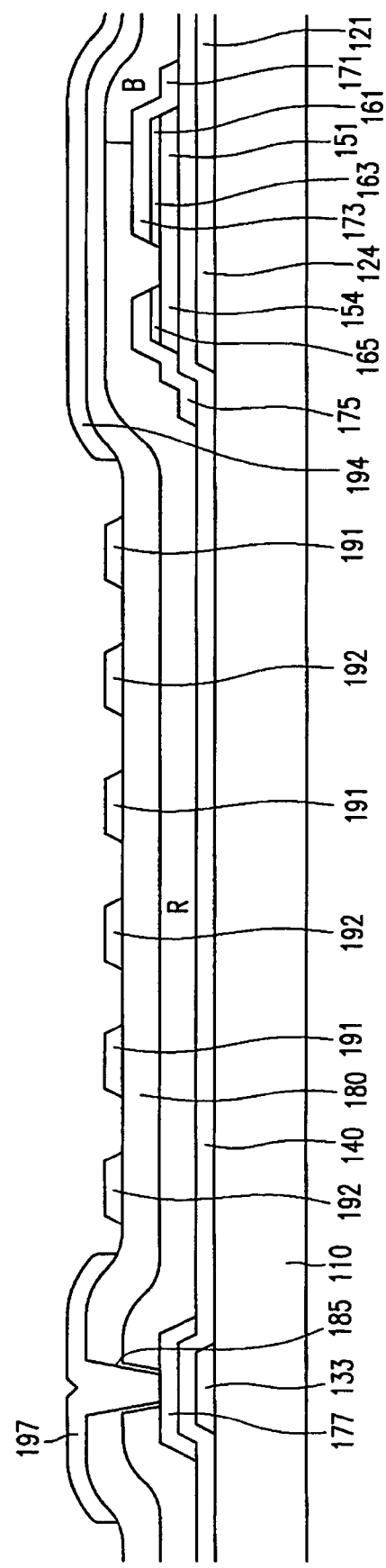
FIG. 10 is a sectional view of the TFT array panel taken along the lines X-X' of FIG. 9.

FIG. 7 is a layout view of a TFT array panel for an LCD according to a second embodiment of the present invention. FIG. 8 is a sectional view of the TFT array panel taken along the lines VIII-VIII' of FIG. 7. FIG. 9 is a layout view of a TFT array panel according to a third embodiment of the present invention. FIG. 10 is a sectional view of the TFT array panel taken along the lines X-X' of FIG. 9.

As shown in FIG. 7 to FIG. 10, the stratified structure of the TFT array panel for the LCD according to the second and third embodiments of the present invention may be mostly the same as that of the TFT array panel for the LCD shown in FIG. 1 and FIG. 2. Namely, a plurality of gate lines 121 including a plurality of gate electrodes 124 and a plurality of storage electrode lines 131 including storage electrodes 133 may be formed on a substrate 110. A gate insulating layer 140, a plurality of semiconductor stripes 151 including a plurality of protrusions 154, a plurality of ohmic contact stripes 161 including a plurality of protrusions 163, and a plurality of ohmic contact islands 165 may be sequentially formed thereon.

A plurality of data lines 171 including a plurality of source electrodes 153, a plurality of drain electrodes 175, and a plurality of storage capacitor conductors 177 may be formed on the ohmic contacts 161 and 165. The gate insulating layer 140 and the passivation layer 180 may be formed thereon.

The passivation layer 180 and/or the gate insulating layer 140 may have a plurality of contact holes 182 and 185. A plurality of pixel electrodes 191 and common electrodes 192 and a plurality of contact assistants 82 may be formed on the passivation layer 180.

Unlike the TFT array panel shown in FIG. 1 and FIG. 2, the TFT array panel for the LCD according to the second embodiment may include semiconductors 151 which have almost the same planar shapes as the data lines 171 and the drain electrodes 175 as well as the underlying ohmic contacts 161 and 165, except for the protrusions 154 where TFTs are provided. That is, the semiconductor stripes 151 include some exposed portions which are not covered with the data lines 171, the drain electrodes 175, and the underlying ohmic contacts 161 and 165, such as portions located between the source electrodes 173 and the drain electrodes 175.

Also, in the TFT array panel for the LCD according to a third embodiment, red, green, and blue color filters R, G, and B having openings exposing the drain electrodes 175 are formed in pixels on the gate insulating layer 140 in a longitudinal direction.

Although shown that the boundary lines of the red, green, and blue color filters R, G, and B match on the upper part of the data line 171, the color filters R, G, and B may overlap each other on the upper part of the data lines 171 to block the light leakage between the pixel areas. The color filters R, G and B are removed on the contact portions where the end portions of the gate lines 121 and the data lines 171 are disposed.

The passivation layer 180 made of an organic insulating material or an inorganic insulating material is formed on the red, green, and blue color filters R, G, and B. At this time, the contact holes 185 exposing the storage capacitor conductor 177 are disposed inward the opening of the color filters R, G, and B.

In such a structure of the TFT array panel, the passivation layer 180 may be disposed under the color filters R, G and B and cover some portion of semiconductors 151 where a channel of TFT is provided and may include an insulating layer made of silicon nitride or silicon oxide.

The same effects as the first and second embodiments can be obtained from a structure of a COA-type of TFT array panel for LCD.

As shown in the embodiments of the present invention, the drain electrodes are formed parallel to the data lines along the long direction of the pixel areas, thereby improving the contrast ratio and reducing light leakage. Also, the common electrodes and the pixel electrodes are formed parallel to and along the edges of the trapezoidal pixel are, thereby enabling to pass light at the boundaries of the pixel areas and improving aperture ratio. Also, the pixel electrodes and the common electrodes are formed of opaque conductive material having low resistivity, thereby securing the contrast and the response speed of LCD and easy application to a large LCD.

Although the present invention has been described herein with the reference to the accompanying embodiments, it is to be understood that the present invention is not limited to those precise embodiments, and that various changes and modifications may be affected therein by one of ordinary skill in the related art without departing from the scope or spirit of the invention.

What is claimed is:

1. A thin film transistor array panel, comprising:
   a plurality of gate lines formed on an insulating substrate and including a plurality of gate electrodes;
   a gate insulating layer covering the gate lines;
   a semiconductor layer formed on the gate insulating layer;
   a plurality of data lines having source electrodes formed at least on the semiconductor layer and intersecting the gate lines;
   a plurality of drain electrodes separated from the data lines and opposite to the data lines with respect to the gate electrode;
   a passivation layer covering the portion of the semiconductor layer that is not covered with the data lines and the drain electrodes;
   a plurality of linear pixel electrodes formed on the passivation layer and coupled to the drain electrodes, at least two of the linear pixel electrodes disposed in each pixel area; and
   a plurality of common electrodes formed on the passivation layer, alternately arranged with the pixel electrodes, substantially parallel to the pixel electrodes;
   a plurality of storage electrode lines formed on the substrate and extending substantially parallel to the gate lines, the storage electrode line comprising a storage electrode that are wider than the other portions;
   wherein the pixel electrodes and the common electrodes are neither perpendicular nor parallel to the data lines,
   wherein the pixel electrodes and the common electrodes are symmetrically arranged with respect to a transverse center line of the pixel, and
   wherein storage electrodes are disposed on the transverse center of the pixel and shaped like triangle or trapezoid.

2. The thin film transistor array panel of claim 1, wherein the common electrodes almost entirely cover gate lines and data lines.

3. The thin film transistor array panel of claim 1, wherein the common electrodes and the pixel electrodes are at an angle of about 60 to about 85 degrees with the data lines.

4. The thin film transistor array panel of claim 1, wherein each of the drain electrodes includes a storage capacitor conductor extending coplanarly directly therefrom and extending substantially transverse to a corresponding drain electrode, that the storage capacitor conductor is connected directly to only one of the linear pixel electrodes.

5. The thin film transistor array panel of claim 4, wherein the pixel electrodes and the common electrodes comprise opaque conductive material.

6. The thin film transistor array panel of claim 4, further comprising a plurality of pixel electrode lines, each pixel electrode line coupled to at least one of the pixel electrodes and comprising a first expansion portion overlapping the storage electrode.

7. The thin film transistor array panel of claim 6, wherein the drain electrodes include a storage capacitor conductor that overlaps the storage electrode.

8. The thin film transistor array panel of claim 7, wherein the first expansion portion is coupled to the storage capacitor conductor through a contact hole of the passivation layer.

9. The thin film transistor array panel of claim 8, further comprising a common electrode body for electrically connecting the common electrodes.

10. The thin film transistor array panel of claim 9, wherein the common electrode body comprises a plurality of second expansion portions that have boundary lines parallel to that of the first expansion portion.

11. The thin film transistor array panel of claim 10, wherein the storage capacitor conductor and the first expansion portion or the second expansion portion have a boundary lines symmetrical with respect to the transverse center-line of the pixel.

12. The thin film transistor array panel of claim 9, wherein the common electrode body for electrically connecting the common electrodes is on a same layer.

13. The thin film transistor array panel of claim 9, wherein the common electrode body for electrically connecting the common electrodes is on a same layer.

14. The thin film transistor array panel of claim 6, wherein the each pixel electrode line coupled to at least one of the pixel electrodes is on a same layer.

15. The thin film transistor array panel of claim 6, wherein the each pixel electrode line coupled to at least one of the pixel electrodes is on a same layer.

16. The thin film transistor array panel of claim 1, further comprising red, green, and blue color filters formed under the pixel electrodes and the common electrodes and sequentially arranged in the pixel area.

17. The thin film transistor array panel of claim 1, wherein the pixel electrodes and the common electrodes are about 300 to about 1,000 Å thick.

18. The thin film transistor array panel of claim 1, wherein each of the drain electrodes includes a storage capacitor conductor extending coplanarly directly therefrom and extending substantially transverse to a corresponding drain electrode, that the storage capacitor conductor is connected directly to only one of the linear pixel electrodes.

19. A liquid crystal display comprising:
   a thin film transistor array panel comprising:
      a plurality of gate lines formed on an insulating substrate and including a plurality of gate electrodes;
      a gate insulating layer covering the gate lines;
      a semiconductor layer formed on the gate insulating layer;
      a plurality of data lines having source electrodes formed at least on the semiconductor layer and intersecting the gate lines;
      a plurality of drain electrodes separated from the data lines and opposite to the data lines with respect to the gate electrode;

a passivation layer covering the portion of the semiconductor layer that is not covered with the data lines and the drain electrodes;

a plurality of linear pixel electrodes formed on the passivation layer and coupled to the drain electrodes, at least two of the linear pixel electrodes disposed in each pixel area; and a plurality of common electrodes formed on the passivation layer, alternately arranged with the pixel electrodes, substantially parallel to the pixel electrodes; and a plurality of storage electrode lines formed on the substrate and extending substantially parallel to the gate lines, the storage electrode line comprising a storage electrode that are wider than the other portions;

wherein the pixel electrodes and the common electrodes are neither perpendicular nor parallel to the data lines, wherein the pixel electrodes and the common electrodes are symmetrically arranged with respect to a transverse center line of the pixel, and wherein storage electrodes are disposed on the transverse center of the pixel and shaped like triangle or trapezoid, an opposite panel facing the thin film transistor array panel; and a liquid crystal layer interposed between the thin film transistor array panel and the opposite panel thereof.

20. The liquid crystal display of claim 19, wherein liquid crystal molecules of the liquid crystal layer are initially aligned perpendicular to or parallel to the data lines.

21. The thin film transistor array panel of claim 19, wherein the common electrodes almost entirely cover gate lines and data lines.

22. The thin film transistor array panel of claim 19, wherein the pixel electrodes and the common electrodes comprise opaque conductive material.

* * * * *